UNITED STATES PATENT OFFICE.

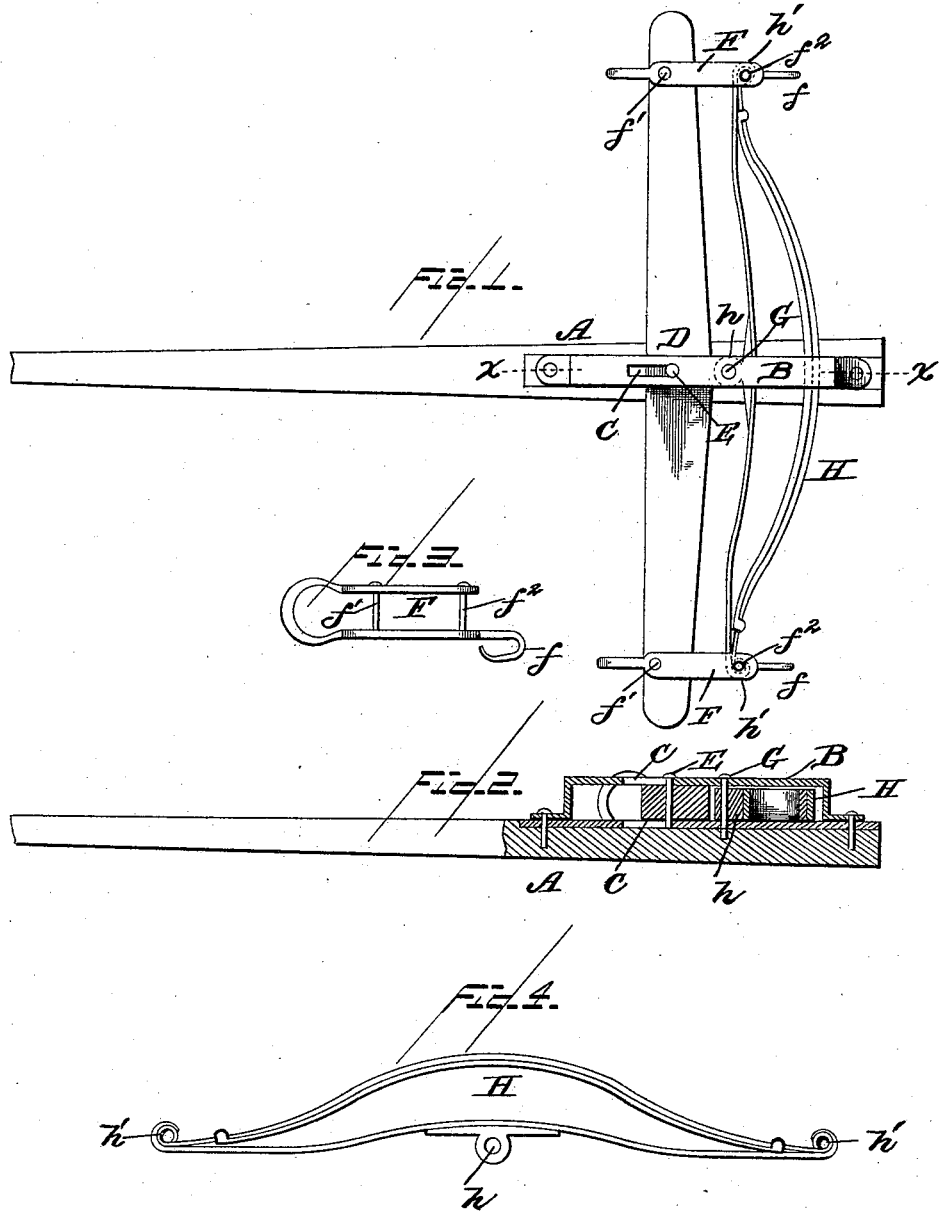

WOODWARD EUGENE HAGARTY, OF ARROW ROCK, MISSOURI.

SPRING DOUBLE-TREE.

SPECIFICATION forming part of Letters Patent No. 337,397, dated March 9, 1886.

Application filed January 12, 1886. Serial No. 188,342. (No model.)

*To all whom it may concern:*

Be it known that I, WOODWARD EUGENE HAGARTY, a citizen of the United States, residing at Arrow Rock, in the county of Saline and State of Missouri, have invented a new and useful Improvement in Spring Double-Trees, of which the following is a specification, reference being had to the accompanying drawings.

My invention relates to an improvement in double-trees; and it consists in the peculiar construction and combination of devices, that will be more fully set forth hereinafter, and particularly pointed out in the claims.

In the drawings, Figure 1 is a top plan view of my invention. Fig. 2 is a sectional view of the same, taken on the line $x\ x$ of Fig. 1. Fig. 3 is a detailed elevation of one of the clevises. Fig. 4 is a detailed plan view of the spring.

A represents the tongue of a vehicle, and B represents a metallic box or keeper which is secured on the upper side of the tongue, near the rear end thereof. The sides of this keeper are open, and through the top and bottom thereof, near the front end, are made vertical slots C. As here shown, the lower side of the keeper is formed by a separate plate; but the keeper may be made of a single piece of metal, if preferred.

D represents the double-tree, which is pivoted on a bolt, E, that works in the slots C of the keeper. To the outer ends of the double-tree are pivoted clevises F, which are bent substantially in the shape of the letter U, thereby forming upper and lower arms that extend rearwardly from the double-tree. The rear end of the lower arm of each clevis extends beyond the upper arm, and is bent to form a hook, $f$, for the attachment of the usual chains that connect the ends of the double-tree with the front axle, to prevent the double-tree from swinging too far on its pivotal bolt. Bolts $f'$ pivot the clevises to the ends of the double-tree, and bolts $f^2$ pass vertically through and connect the arms of the clevises in rear of the bolts $f'$.

H represents a semi-elliptic leaf-spring, the front bar of which is provided at the center with an eye, $h$, through which and through openings made in the keeper passes a bolt, G, that pivots the spring to the tongue in rear of the double-tree. In the outer ends of the spring are formed eyes $h'$, which receive the bolts $f^2$, and thereby pivot the ends of the spring to the rear extending ends of the clevises. The rear side of the spring works freely in the keeper.

Single-trees, which are not here shown, as they form no part of this invention, are attached to the clevises in the usual way.

When a team is drawing a wagon provided with my improved double-tree, the draft thereon is sustained by the spring, as the double-tree is free to move back and forth on the tongue, and thus eases the load to the animals, and prevents the play of the tongue from jerking and annoying them. When the team first starts, the double-tree and the spring yield slightly before starting the wagon, and thus relieve the shoulders of the animals of excessive strain. While the team is in motion the spring exerts a constant pressure or tension on the traces, keeping them taut, and preventing the collars from slipping and working on the horses and galling and bruising their necks and shoulders.

The invention is also very efficacious with a young and fiery team, by reason of the ease with which they can draw the load, preventing any desire on their part to break loose and run away.

The invention will also be found very useful in plowing.

Having thus described my invention, I claim—

1. The combination of the pivoted spring, the movable double-tree, and the clevises having the arms pivoted to the ends of the double-tree and of the spring, substantially as described.

2. The combination of the pivoted spring, the double-tree, and the clevises connecting the ends of the spring and double-tree, the said clevises being bent substantially in U form, and having the extending arms formed into hooks, for the purpose set forth, substantially as described.

In testimony that I claim the foregoing as my own I have hereto affixed my signature in presence of two witnesses.

WOODWARD EUGENE HAGARTY.

Witnesses:
P. J. MITCHELL,
F. N. TOWNSEND.